United States Patent [19]
Dowe

[11] Patent Number: 5,717,964
[45] Date of Patent: Feb. 10, 1998

[54] CAMERA EXPOSURE APPARATUS HAVING FLASH TUBES FOR CORRECTING FOR OVEREXPOSURE

[75] Inventor: David R. Dowe, Holley, N.Y.

[73] Assignee: Eastman Kodak Company, Rochester, N.Y.

[21] Appl. No.: 802,455

[22] Filed: Feb. 18, 1997

[51] Int. Cl.⁶ .................................................. G03B 15/05
[52] U.S. Cl. ........................... 396/165; 396/174; 396/182
[58] Field of Search ................................... 396/165, 174, 396/182

[56] References Cited

U.S. PATENT DOCUMENTS

| 4,384,238 | 5/1983 | Greenwald et al. | 315/151 |
| 5,136,312 | 8/1992 | Weaver et al. | 354/132 |

*Primary Examiner*—W. B. Perkey
*Attorney, Agent, or Firm*—Raymond L. Owens

[57] ABSTRACT

An exposure apparatus for flash illuminating a subject is disclosed. The exposure apparatus includes a main flash tube for directly illuminating the subject, a bounce flash tube for indirectly illuminating the subject, and sensing circuitry responsive to ambient scene illumination for producing an ambient scene illumination signal, and responsive to light from the main flash tube reflected from the subject for producing a reflected flash illumination signal. The exposure apparatus further includes circuitry for defining a first reference voltage signal corresponding to a predetermined scene illumination level, circuitry for defining a second reference voltage signal corresponding to a predetermined reflected flash illumination level, first voltage comparator circuitry responsive to the ambient scene illumination signal and the first reference voltage signal for producing a main flash signal to energize the main flash tube when the ambient scene illumination signal is below the predetermined ambient scene illumination level, and second voltage comparator circuitry responsive to the reflected flash illumination signal and the second reference voltage signal for producing a bounce flash signal to energize the bounce flash tube and deenergize the main flash tube when the reflected flash illumination signal is above the predetermined reflected flash illumination level.

12 Claims, 3 Drawing Sheets

CAMERA EXPOSURE APPARATUS HAVING FLASH TUBES FOR CORRECTING FOR OVEREXPOSURE

FIELD OF THE INVENTION

The present invention relates to the field of artificial illumination for image capture, and in particular, to camera exposure apparatus which provides direct and indirect flash illumination.

BACKGROUND OF THE INVENTION

The use of artificial light sources, such as electronic flash, to properly illuminate a photographic subject or scene is well established. Many point-and-shoot cameras today have a simple flash system for artificially illuminating the photographic subject or scene. Once the flash tube in these cameras is triggered, the emission of light from the flash tube cannot be stopped until most of the energy from the flash capacitor is used up. This can result in overexposed pictures when the subject being photographed is too close to the camera. To prevent this overexposure of flash photographs, more expensive cameras utilize circuitry to shut down the flash tube while it is emitting light. Typically, an insulated gate bipolar transistor (IGBT) is used to shut down the flash tube. However, IGBT's are expensive and require additional circuitry to work properly.

Early instant cameras utilized a quench tube to shut down the flash tube and prevent overexposure of the subject being photographed. These cameras would detect light reflected from the subject and would fire the quench tube when the reflected light reached a predetermined level. Because the quench tube was of a much lower impedance than the flash tube, the energy stored in the flash capacitor would be shunted to the quench tube and thereby extinguish the flash tube. However, this resulted in excess energy in the flash capacitor to be wasted and lost.

In addition, use of one flash tube to provide direct flash illumination can cause undesirable conditions such as harsh shadows, specular reflections, red eye, and high contrast or loss of tonal detail, and can produce a photograph which has an unnatural appearance. Indirect flash illumination, which is commonly referred to as bounce flash, is well known in the art to eliminate many of the undesirable characteristics of direct lighting and to give the appearance that the subject is illuminated from above in a way characteristic of natural lighting by the sun.

Typically, in apparatus utilizing both direct flash tube and bounce flash tubes, the bounce flash is fired at the same time as the direct flash illumination, or the bounce flash may be used exclusively. However, use of indirect flash illumination alone can produce a photograph with harsh dark shadows. Other apparatus fire the bounce flash first and then fire the direct flash. Because indirect flash illumination requires much more energy than direct flash illumination, energy needed to properly illuminate the subject using direct flash would be wasted by firing the indirect flash. As a result, the direct flash would not have sufficient energy to properly illuminate the subject. If direct and indirect flash illumination are maintained in proper proportion to each other, a more pleasing balanced flash exposure results.

SUMMARY OF THE INVENTION

Accordingly, it is an object of the present invention to correct for overexposure of a photographic subject by providing direct and indirect flash illumination.

This object is achieved by an exposure apparatus for flash illuminating a subject, comprising:

(a) a main flash tube for directly illuminating the subject;

(b) a bounce flash tube for indirectly illuminating the subject;

(c) sensing means responsive to ambient scene illumination for producing an ambient scene illumination signal, and responsive to light from the main flash tube reflected from the subject for producing a reflected flash illumination signal;

(d) means for defining a first reference voltage signal corresponding to a predetermined scene illumination level, and means for defining a second reference voltage signal corresponding to a predetermined reflected flash illumination level;

(e) first voltage comparator means responsive to the ambient scene illumination signal and the first reference voltage signal for producing a main flash signal to energize the main flash tube when the ambient scene illumination signal is below the predetermined ambient scene illumination level; and (f) second voltage comparator means responsive to the reflected flash illumination signal and the second reference voltage signal for producing a bounce flash signal to energize the bounce flash tube and deenergize the main flash tube when the reflected flash illumination signal is above the predetermined reflected flash illumination level.

ADVANTAGES

An advantage of the present invention is to provide exposure apparatus which prevents overexposure of a photographic subject when the subject is positioned too close to the camera.

Another advantage of the present invention is to provide exposure apparatus which prevents underexposure of a photographic subject when the subject is positioned far from the camera.

Yet another advantage of the present invention is to provide exposure apparatus which properly illuminates a subject that is being photographed outdoors.

A further advantage of the present invention is to provide exposure apparatus which is relatively simple in structure and inexpensive to manufacture, as well as efficient in operation.

DETAILED DESCRIPTION OF THE PREFERRED EMBODIMENT

Figure 1:
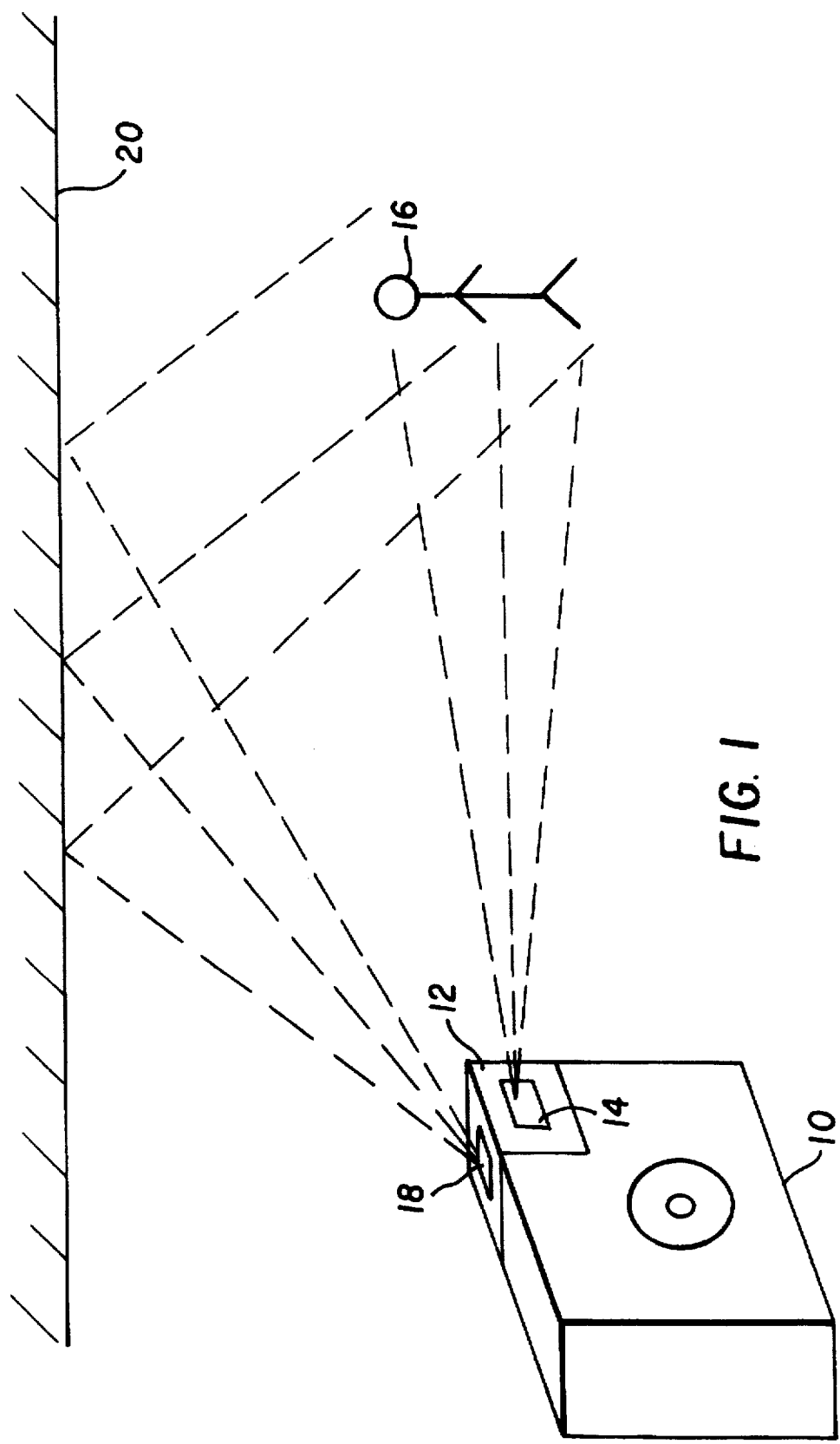
FIG. 1 is a schematic pictorial view showing a camera having an exposure apparatus including a main flash tube and a bounce flash tube in accordance with the present invention.

Referring to FIG. 1, a camera 10 is shown having an exposure apparatus 12 in accordance with the present invention. The exposure apparatus 12 includes a main flash tube 14 for directly illuminating a subject 16 to be photographed.

The exposure apparatus 12 further includes a bounce flash tube 18 for projecting light toward a reflecting surface 20 to indirectly illuminate the subject 16. Preferably, the bounce flash tube 18 projects light at a 45 degree angle toward the reflecting surface 20. Typically, the reflecting surface 20 is a ceiling in a room where the subject is being photographed. Preferably, the bounce flash tube 18 is of much lower impedance than the main flash tube 14.

Figure 2:
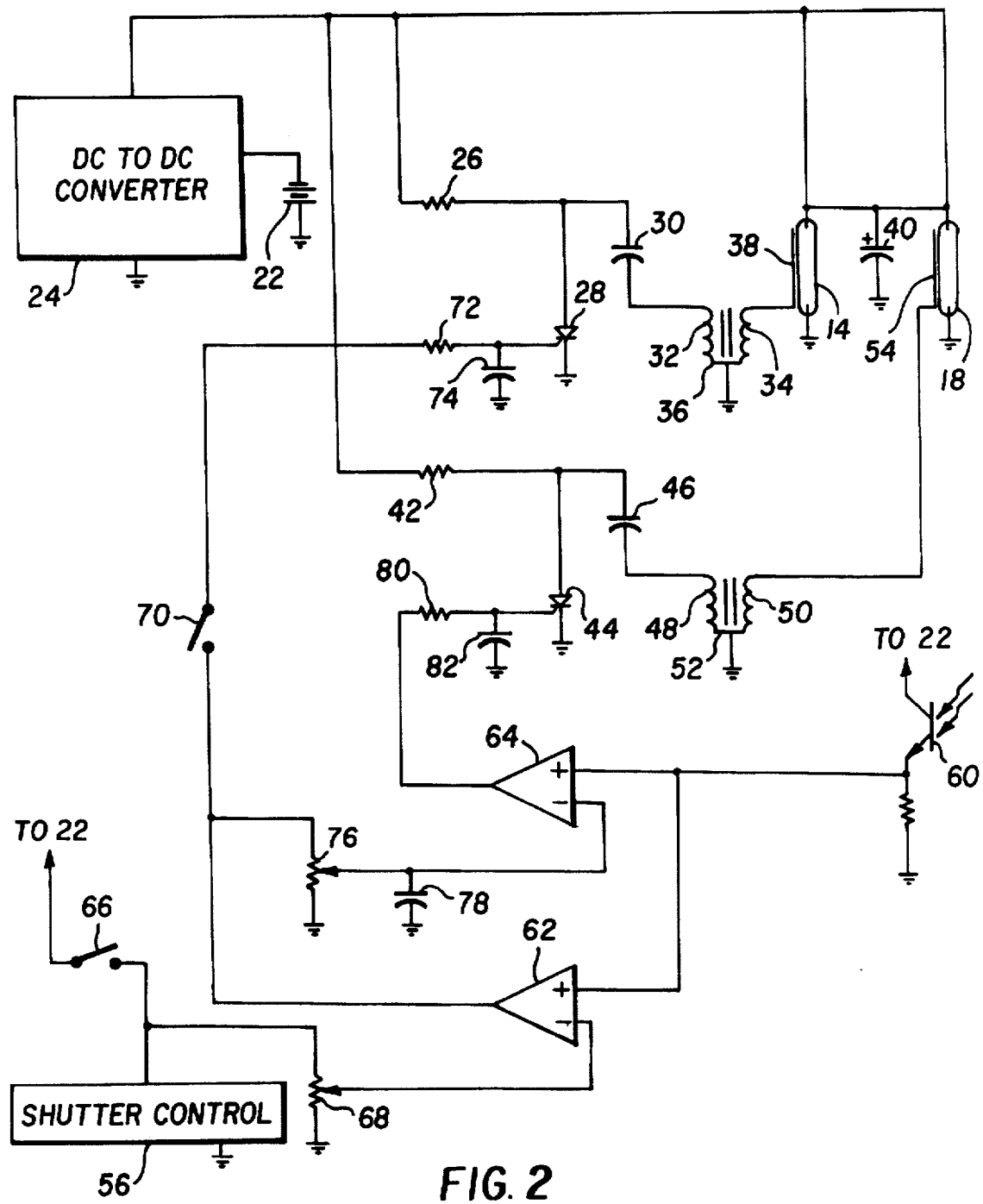
FIG. 2 is an electrical circuit for operating the main flash tube and bounce flash tube of FIG. 1 in accordance with a first embodiment of the present invention.

Referring now to FIG. 2, an electrical circuit is shown for operating the exposure apparatus 12 of FIG. 1 in accordance with a first embodiment of the present invention. The circuit is connected to a battery 22, which typically has a voltage of 1.5 to 3.0 volts. The battery 22 is connected to a DC to DC converter 24, which converts the battery voltage to a higher voltage, typically 330 volts, for energizing the main flash tube 14 and the bounce flash tube 18.

Turning to the portion of the circuit for operating the main flash tube 14, the output of the DC to DC converter 24 is connected through a first limiting resistor 26 to the anode of a main flash silicon control rectifier (SCR) 28. The junction between the first limiting resistor 26 and the anode of the main flash SCR 28 is connected to a main trigger capacitor 30. The main trigger capacitor 30 is connected to a primary winding 32 of a main trigger transformer 36. A secondary winding 34 of the main trigger transformer 36 is connected to an electrode 38 of the main flash tube 14. One terminal of the main flash tube 14 is connected to ground and the other terminal of the main flash tube 14 is connected to a flash capacitor 40. The flash capacitor 40 stores energy for the main flash tube 14 and the bounce flash tube 18.

Turning now to the portion of the circuit for operating the bounce flash tube 18, the output of the DC to DC converter 24 is also connected through a second limiting resistor 42 to the anode of a bounce flash SCR 44. The junction between the second limiting resistor 42 and the anode of the bounce flash SCR 44 is connected to a bounce trigger capacitor 46. The bounce trigger capacitor 46 is connected to a primary winding 48 of a bounce trigger transformer 52. The secondary winding 50 of the bounce trigger transformer 52 is connected to an electrode 54 of the bounce flash tube 18. One terminal of the bounce flash tube 18 is connected to ground and the other terminal of the bounce flash tube 18 is connected to the flash capacitor 40.

The circuit further includes a photodetector 60 which is aimed toward the subject or scene to be photographed. The photodetector 60 is connected to the positive terminal of a first voltage comparator 62 and the positive terminal of a second voltage comparator 64. The negative terminal of the first voltage comparator 62 is connected through a first reference potentiometer 68 to a shutter switch 66. The first reference potentiometer 68 sets a predetermined reference voltage corresponding to a desired ambient scene illumination. The shutter switch 66, which is connected to shutter control circuitry 56, closes in response to operation of a camera shutter button (not shown). The output of the first voltage comparator 62 is connected through a synchronization switch 70, a resistor 72, and a capacitor 74 to the gate of the main flash SCR 34. The first voltage comparator 62 is connected to the second voltage comparator 64 through a second reference potentiometer 76 and a capacitor 78. The second reference potentiometer 76 sets a predetermined reference voltage corresponding to a desired reflected scene illumination. The output of the second voltage comparator 64 is connected through a resistor 80 and a capacitor 82 to the gate of the bounce flash SCR 44.

In operation, the DC to DC converter 24 turns on and the photodetector 60 is energized when the camera 10 is turned on. When the DC to DC converter 24 generates 330 volts, the main trigger capacitor 30 gets charged to 330 volts through the limiting resistor 26 and the primary winding 32 of the main trigger transformer 36, and the bounce trigger capacitor 46 gets charged to 330 volts through the limiting resistor 42 and the primary winding 48 of the bounce trigger transformer 52. In addition, the high voltage from the DC to DC converter 24 charges up the flash capacitor 40 to 330 volts.

When a photograph is desired, the camera shutter button is pressed, which opens a camera shutter (not shown) and simultaneously closes the shutter switch 66. Shutter blades (not shown) cause the synchronization switch 70 to close. The photodetector 60 then detects the ambient scene illumination and generates an output voltage signal that is proportional to the ambient scene illumination. The first voltage comparator 62 compares the output voltage signal from the photodetector 60 to the predetermined reference voltage set by the first reference potentiometer 68. When the output voltage signal from the photodetector 60 is low, indicating a low ambient light level on the scene and the need for flash illumination, the first voltage comparator 62 produces a high output voltage signal which triggers the main flash SCR 28. When the main flash SCR 28 is triggered, a series circuit is formed by the main flash SCR 28, the main trigger transformer 36, and the main trigger capacitor 30. The main trigger capacitor 30 then shorts to ground, causing current to flow through the primary winding 32 of the main trigger transformer 36 and a high voltage signal to be produced by the secondary winding 34 of the main trigger transformer 36 which ionizes the gas in the main flash tube 14. The ionized gas makes the main flash tube 14 conductive and causes the flash capacitor 40 to discharge through the main flash tube 14 and directly illuminate the subject 16.

The photodetector 60 then detects the light from the main flash tube 14 that is reflected from the subject 16 and generates an output voltage signal that is proportional to the reflected light. The second voltage comparator 64 compares the output voltage signal from the photodetector 60 to the predetermined reference voltage set by the second reference potentiometer 76.

When the output voltage signal from the photodetector 60 is greater than the reference voltage set by the second reference potentiometer 76, indicating that the subject 16 is close to the camera 10 and could be overexposed, the second voltage comparator 64 produces a high output voltage signal which triggers the bounce flash SCR 44. When the bounce flash SCR 44 is triggered, a series circuit is formed by the bounce flash SCR 44, the bounce trigger transformer 52, and the bounce trigger capacitor 46. The bounce trigger capacitor 46 then shorts to ground, causing current to flow through the primary winding 48 of the bounce trigger transformer 52 and a high voltage signal to be produced by the secondary winding 50 of the bounce trigger transformer 52. This high voltage signal ionizes the gas in the bounce flash tube 18, which makes the bounce flash tube 18 conductive. Since the bounce flash tube 18 is of much lower impedance than the main flash tube 14, the flash capacitor 40 discharges through the bounce flash tube 18, causing the bounce flash tube 18 to fire and indirectly illuminate the subject 16. By firing the bounce flash tube 18, the main flash tube 14 is shunted and deprived of its energy source which stops the main flash tube 14 from emitting light. Thus, the bounce flash tube prevents the subject 16 from being overexposed by direct illumination from the main flash tube 16. This is especially advantageous when the subject 16 is being photographed outdoors or when an outdoor scene is being photographed. In such a case, the bounce flash tube 18 will still shunt the energy from the main flash tube 14 to prevent overexposure, even though the light from the bounce flash tube 18 will not be reflected off a reflecting surface. Thus, when the subject 16 being photographed outdoors is too close to the camera 10, the subject 16 will be properly illuminated.

When the output voltage signal from the photodetector 60 is less than the reference voltage set by the second reference potentiometer 76, indicating that the subject 16 is far from the camera 10 (i.e. at the limits of the flash range) and that a significant amount of direct flash illumination is required, the second voltage comparator 64 produces a low output voltage signal which does not trigger the bounce flash SCR 44. The bounce flash tube 18 does not fire, and thus, does not shunt the main flash tube 14 from emitting light. Accordingly, all available energy will be directed toward the subject 16 to properly illuminate the subject 16, and no energy is wasted by first activating the bounce flash and then activating the main flash. Underexposure of the subject 16 is prevented, provided that the subject 16 is within the flash range (typically twelve to fourteen feet from the camera 10). This is especially advantageous when the subject 16 is being photographed outdoors or when an outdoor scene is being photographed and bounce flash illumination is not needed.

When the subject or scene is sufficiently illuminated by natural light so that artificial flash illumination is not needed, the output voltage signal from the photodetector 60 is high, which causes the first voltage comparator 62 to produce a low output voltage signal. This low output voltage signal does not trigger the main flash SCR 28 at the closing of the synchronization switch 70. Thus, the main flash tube 14 does not fire when the camera shutter button is pressed. In addition, the low output voltage from the first voltage comparator 62 inhibits the function of the second voltage comparator 64 by changing the reference voltage so that the bounce flash SCR 44 is not triggered. Thus, the bounce flash tube 18 does not fire. Accordingly, the subject 16 is neither illuminated by direct flash from the main flash tube 14 or by indirect flash from the bounce flash tube 18.

Figure 3:
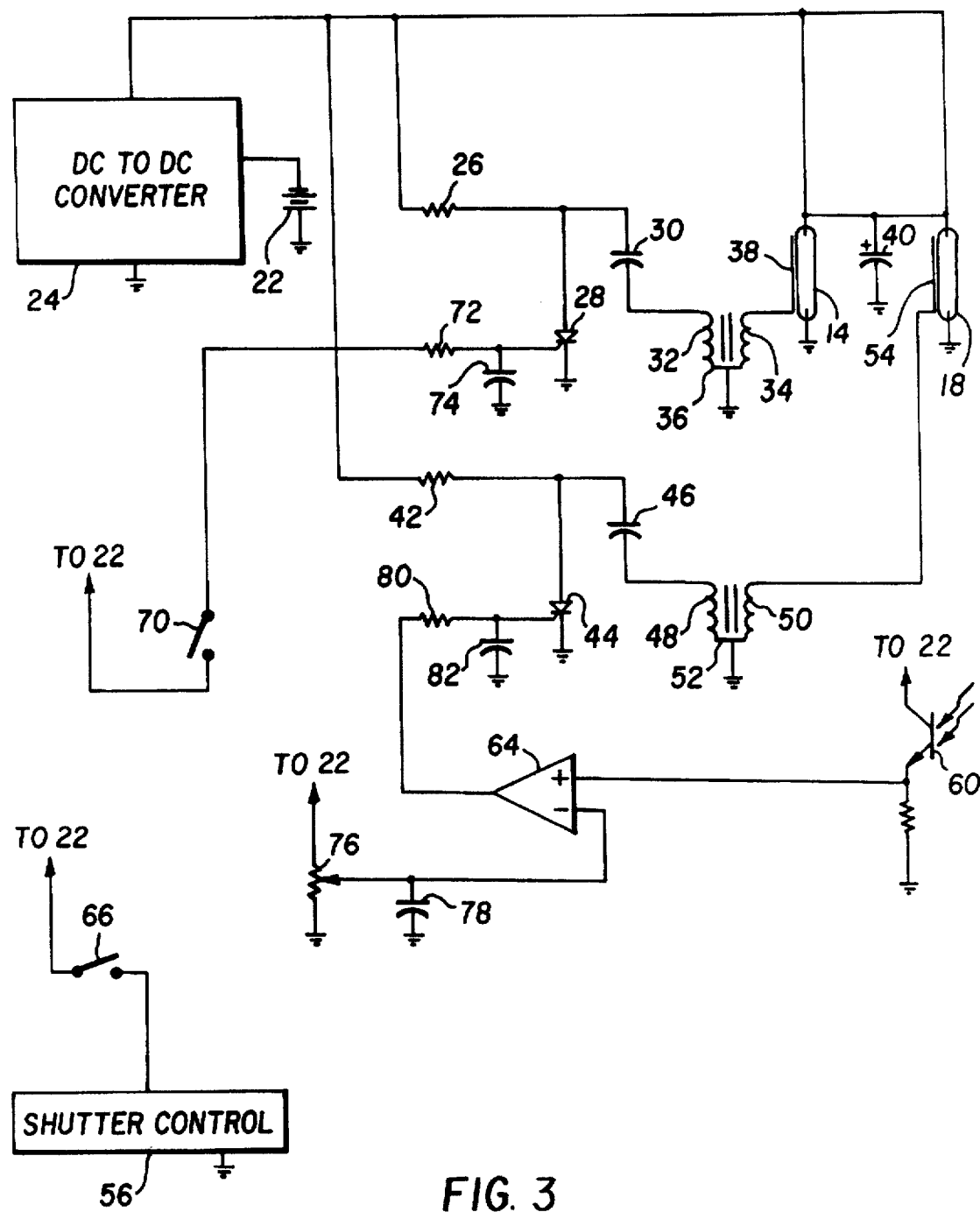
FIG. 3 is an electrical circuit for operating the main flash tube and bounce flash tube of FIG. 1 in accordance with a second embodiment of the present invention.

Referring now to FIG. 3, an electrical circuit is shown for operating the exposure apparatus 12 of FIG. 1 in accordance with a second embodiment of the present invention. The portions of the circuit for operating the main flash tube 14 and the bounce flash tube 18 are substantially similar to foregoing circuit of FIG. 2, with the exception that the first reference potentiometer 68 and the first voltage comparator 62 are not included in the main flash tube operating circuit. Accordingly, where parts or elements correspond to FIG. 2, the same reference numerals will be used.

In operation, the DC to DC converter 24 turns on and the photodetector 60 is energized when the camera 10 is turned on. When the DC to DC converter 24 generates 330 volts, the main trigger capacitor 30 gets charged to 330 volts through the limiting resistor 26 and the primary winding 32 of the main trigger transformer 36, and the bounce trigger capacitor 46 gets charged to 330 volts through the limiting resistor 42 and the primary winding 48 of the bounce trigger transformer 52. In addition, the high voltage from the DC to DC converter 24 charges up the flash capacitor 40 to 330 volts.

When a photograph is desired, the camera shutter button (not shown) is pressed, which opens a camera shutter (not shown) and simultaneously closes the shutter switch 66, which is connected to shutter control circuitry 56. Shutter blades (not shown) then close the synchronization switch 70.

When the synchronization switch 70 closes, the main flash SCR 28 is triggered and a series circuit is formed by the main flash SCR 28, the main trigger transformer 36, and the main trigger capacitor 30. The main trigger capacitor 30 then shorts to ground, causing current to flow through the primary winding 32 of the main trigger transformer 36 and a high voltage signal to be produced by the secondary winding 34 of the main trigger transformer 36 which ionizes the gas in the main flash tube 14. The ionized gas makes the main flash tube 14 conductive and causes the flash capacitor 40 to discharge through the main flash tube 14 and directly illuminate the subject 16.

The photodetector 60 detects the light from the main flash tube 14 that is reflected from the subject 16 and generates an output voltage signal that is proportional to the reflected light. The voltage comparator 64 compares the output voltage signal from the photodetector 60 to a predetermined reference voltage set by the reference potentiometer 76 that corresponds to a desired reflected scene illumination.

When the output voltage signal from the photodetector 60 is greater than the reference voltage set by the reference potentiometer 76, indicating that the subject 16 is close to the camera 10 and could be overexposed, the voltage comparator 64 produces a high output voltage signal that triggers the bounce flash SCR 44. When the bounce flash SCR 44 is triggered, a series circuit is formed by the bounce flash SCR 44, the bounce trigger transformer 52, and the bounce trigger capacitor 46. The bounce trigger capacitor 46 then shorts to ground, causing current to flow through the primary winding 48 of the bounce trigger transformer 52 and a high voltage signal to be produced by the secondary winding 50 of the bounce trigger transformer 52. This high voltage signal ionizes the gas in the bounce flash tube 18, which makes the bounce flash tube 18 conductive. Since the bounce flash tube 18 is of much lower impedance than the main flash tube 14, the flash capacitor 40 discharges through the bounce flash tube 18, causing the bounce flash tube 18 to fire and indirectly illuminate the subject 16. By firing the bounce flash tube 18, the main flash tube 14 is shunted and deprived of its energy source which stops the main flash tube 14 from emitting light. Thus, the bounce flash tube 18 prevents the subject 16 from being overexposed by direct illumination from the main flash tube 14.

When the output voltage signal from the photodetector 60 is less than the reference voltage set by the reference potentiometer 76, indicating that the subject 16 is far from the camera (i.e. at the limits of the flash range) and that a significant amount of direct flash illumination is required, the voltage comparator 64 produces a low output voltage signal which does not trigger the bounce flash SCR 44. The bounce flash tube 18 does not fire, and thus, does not shunt the main flash tube 14 from emitting light. Accordingly, all available energy will be directed toward the subject 16 to properly illuminate the subject 16. This prevents underexposure of the subject 16, provided that the subject 16 is within the flash range.

The invention has been described in detail with particular reference to certain preferred embodiments thereof. However, it will be appreciated that variations and modifications can be effected by a person of ordinary skill in the art without departing from the spirit and scope of the invention.

PARTS LIST 10 camera
12 exposure apparatus 14 main flash tube
16 photographic subject
18 bounce flash tube
20 reflecting surface
22 battery
24 DC to DC converter
26 first limiting resistor
28 main flash SCR
30 main trigger capacitor
32 primary winding
34 secondary winding
36 main trigger transformer
38 electrode
40 flash capacitor
42 second limiting resistor
44 bounce flash SCR
46 bounce trigger capacitor
48 primary winding
50 secondary winding
52 bounce trigger transformer
54 electrode
56 shutter control circuitry
60 photodetector
62 voltage comparator
64 voltage comparator
66 shutter switch
68 reference potentiometer
70 synchronization switch
72 resistor
74 capacitor
76 reference potentiometer
78 capacitor
80 resistor
82 capacitor

What is claimed is:

1. An exposure apparatus for flash illuminating a subject, comprising:
   (a) a main flash tube for directly illuminating the subject;
   (b) a bounce flash tube for indirectly illuminating the subject;
   (c) sensing means responsive to ambient scene illumination for producing an ambient scene illumination signal, and responsive to light from the main flash tube reflected from the subject for producing a reflected flash illumination signal;
   (d) means for defining a first reference voltage signal corresponding to a predetermined scene illumination level, and means for defining a second reference voltage signal corresponding to a predetermined reflected flash illumination level;
   (e) first voltage comparator means responsive to the ambient scene illumination signal and the first reference voltage signal for producing a main flash signal to energize the main flash tube when the ambient scene illumination signal is below the predetermined ambient scene illumination level; and
   (f) second voltage comparator means responsive to the reflected flash illumination signal and the second reference voltage signal for producing a bounce flash signal to energize the bounce flash tube and deenergize the main flash tube when the reflected flash illumination signal is above the predetermined reflected flash illumination level.

2. The exposure apparatus of claim 1 wherein the first voltage comparator means includes a first capacitor and a first transformer connected to the first capacitor, the first capacitor being charged when the main flash tube is deenergized, and the second voltage comparator means includes a second capacitor and a second transformer connected to the second capacitor, the second capacitor being charged when the bounce flash tube is deenergized.

3. The exposure apparatus of claim 2 wherein the first voltage comparator means further includes a first SCR connected to the first capacitor, the main flash signal being adapted to energize the first SCR when the ambient scene illumination is below the predetermined ambient scene illumination level to cause the first SCR to complete a circuit so that the first capacitor discharges causing the first transformer to produce a signal which energizes the main flash tube, and wherein the second voltage comparator means further includes a second SCR connected to the second capacitor, the bounce flash signal being adapted to energize the second SCR when the reflected flash illumination is above the predetermined reflected flash illumination level to cause the second SCR to complete a circuit so that the second capacitor discharges causing the second transformer to produce a signal which energizes the bounce flash tube and deenergizes the main flash tube.

4. An exposure apparatus for flash illuminating a subject, comprising:
   (a) a main flash tube for directly illuminating the subject;
   (b) a bounce flash tube for indirectly illuminating the subject;
   (c) sensing means responsive to ambient scene illumination for producing an ambient scene illumination signal, and responsive to light from the main flash tube reflected from the subject for producing a reflected flash illumination signal;
   (d) means for defining a first reference voltage signal corresponding to a predetermined scene illumination level, and means for defining a second reference voltage signal corresponding to a predetermined reflected flash illumination level;
   (e) a flash capacitor connected to the main flash tube and the bounce flash tube;
   (f) first voltage comparator means responsive to the ambient scene illumination signal and the first reference voltage signal for producing a main flash signal to energize the main flash tube and cause the flash capacitor to discharge through the main flash tube when the ambient scene illumination signal is below the predetermined scene illumination level; and
   (g) second voltage comparator means responsive to the reflected flash illumination signal and the second reference voltage signal for producing a bounce flash signal to energize the bounce flash tube and cause the flash capacitor to discharge through the bounce flash tube and to deenergize the main flash tube when the reflected flash illumination signal is above the predetermined reflected flash illumination level.

5. The exposure apparatus of claim 4 wherein the first voltage comparator means includes a first capacitor and a first transformer connected to the first capacitor, the first capacitor being charged when the main flash tube is deenergized, and the second voltage comparator means includes a second capacitor and a second transformer connected to the second capacitor, the second capacitor being charged when the bounce flash tube is deenergized.

6. The exposure apparatus of claim 5 wherein the first voltage comparator means further includes a first SCR connected to the first capacitor, the main flash signal being adapted to energize the first SCR when the ambient scene illumination is below the predetermined ambient scene illumination level to cause the first SCR to complete a circuit so that the first capacitor discharges causing the first transformer to produce a signal which energizes the main flash tube and causes the flash capacitor to discharge through the main flash tube, and wherein the second voltage comparator means further includes a second SCR connected to the second capacitor, the bounce flash signal being adapted to energize the second SCR when the reflected flash illumination is above the predetermined reflected flash illumination level to cause the second SCR to complete a circuit so that the second capacitor discharges causing the second transformer to produce a signal which energizes the bounce flash tube and causes the flash capacitor to discharge through the bounce flash tube and deenergizes the main flash tube.

7. An exposure apparatus for flash illuminating a subject, comprising:
   (a) a main flash tube and means for energizing the main flash tube to directly illuminate the subject;
   (b) a bounce flash tube for indirectly illuminating the subject;
   (c) sensing means responsive to light from the main flash tube reflected from the subject for producing a reflected flash illumination signal;
   (d) means for defining a reference voltage signal corresponding to a predetermined reflected flash illumination level; and
   (e) voltage comparator means responsive to the reflected flash illumination signal and the reference voltage signal for producing a bounce flash signal to energize the bounce flash tube and deenergize the main flash tube when the reflected flash illumination signal is above the predetermined reflected flash illumination level.

8. The exposure apparatus of claim 7 wherein the main flash tube energizing means includes a first capacitor and a first transformer connected to the first capacitor, the first capacitor being charged when the main flash tube is deenergized, and the voltage comparator means includes a second capacitor and a second transformer connected to the second capacitor, the second capacitor being charged when the bounce flash tube is deenergized.

9. The exposure apparatus of claim 8 wherein the main flash tube energizing means further includes a first SCR connected to the first capacitor, the main flash signal being adapted to energize the first SCR to cause the first SCR to complete a circuit so that the first capacitor discharges causing the first transformer to produce a signal which energizes the main flash tube, and wherein the voltage comparator means further includes a second SCR connected to the second capacitor, the bounce flash signal being adapted to energize the second SCR when the reflected flash illumination is above the predetermined reflected flash illumination level to cause the second SCR to complete a circuit so that the second capacitor discharges causing the second transformer to produce a signal which energizes the bounce flash tube and deenergizes the main flash tube.

10. An exposure apparatus for flash illuminating a subject, comprising:
    (a) a main flash tube and means for energizing the main flash tube to directly illuminate the subject;
    (b) a bounce flash tube for indirectly illuminating the subject;
    (c) sensing means responsive to light from the main flash tube reflected from the subject for producing a reflected flash illumination signal;
    (d) means for defining a reference voltage signal corresponding to a predetermined reflected flash illumination level;
    (e) a flash capacitor connected to the main flash tube and the bounce flash tube; and
    (f) voltage comparator means responsive to the reflected flash illumination signal and the reference voltage signal for producing a bounce flash signal to energize the bounce flash tube and cause the flash capacitor to discharge through the bounce flash tube and to deenergize the main flash tube when the reflected flash illumination signal is above the predetermined reflected flash illumination level.

11. The exposure apparatus of claim 10 wherein the main flash tube energizing means includes a first capacitor and a first transformer connected to the first capacitor, the first capacitor being charged when the main flash tube is deenergized, and the voltage comparator means includes a second capacitor and a second transformer connected to the second capacitor, the second capacitor being charged when the bounce flash tube is deenergized.

12. The exposure apparatus of claim 11 wherein the main flash tube energizing means further includes a first SCR connected to the first capacitor, the main flash signal being adapted to energize the first SCR to cause the first SCR to complete a circuit so that the first capacitor discharges causing the first transformer to produce a signal which energizes the main flash tube and causes the flash capacitor to discharge through the main flash tube, and wherein the voltage comparator means further includes a second SCR connected to the second capacitor, the bounce flash signal being adapted to energize the second SCR when the reflected flash illumination is above the predetermined reflected flash illumination level to cause the second SCR to complete a circuit so that the second capacitor discharges causing the second transformer to produce a signal which energizes the bounce flash tube and causes the flash capacitor to discharge through the bounce flash tube and deenergizes the main flash tube.

* * * * *